D. & W. W. BEAL.

Corn-Planter.

No. 30,865. Patented Dec 11, 1860.

Witnesses:
J. W. Coombs
R. S. Spencer

Inventor:
D. & W. W. Beal
by Munn & Co.
Attys.

UNITED STATES PATENT OFFICE.

D. BEAL AND W. W. BEAL, OF LESTER, IOWA.

IMPROVEMENT IN SEEDING-MACHINES.

Specification forming part of Letters Patent No. 30,865, dated December 11, 1860.

*To all whom it may concern:*

Be it known that we, DEXTER BEAL and W. W. BEAL, of Lester, in the county of Black Hawk and State of Iowa, have invented a new and Improved Seeding-Machine; and we do hereby declare that the following is a full, clear, and exact description of the same, reference being had to the annexed drawings, making a part of this specification, in which—

Figure 1:
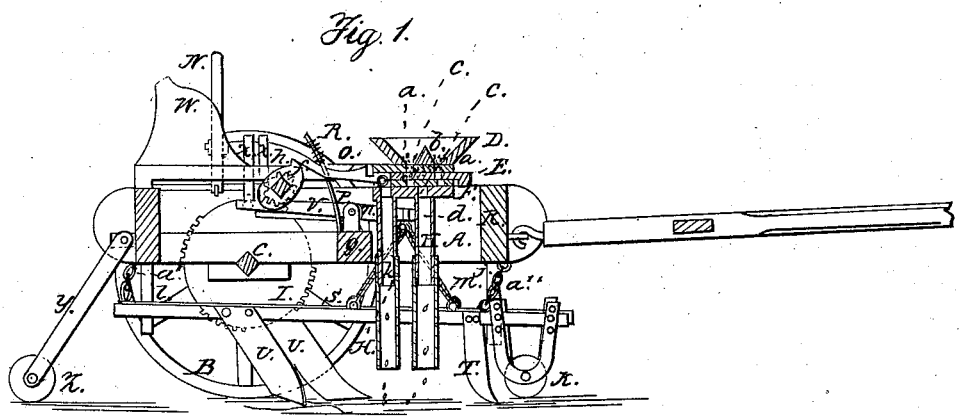
Figure 2:
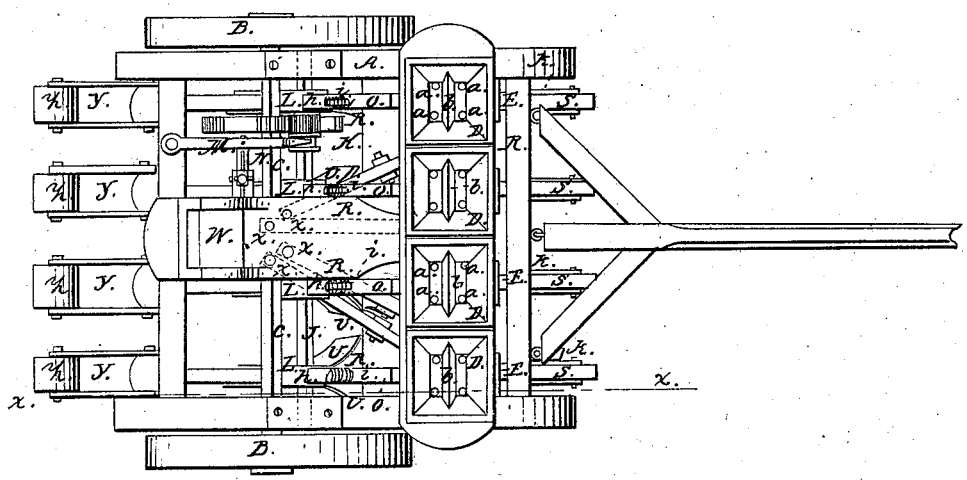

Figure 1 is a side sectional view of our invention, taken in the line $x\ x$, Fig. 2; Fig. 2, a plan or top view of the same.

Similar letters of reference indicate corresponding parts in both figures.

To enable those skilled in the art to fully understand and construct our invention, we will proceed to describe it.

A represents a rectangular frame, which is mounted on two wheels, B B, placed on independent axles C C'.

On the front part of the frame A there is placed a series of hoppers, D, side by side, and the bottom of each hopper is perforated with four holes, $a$, one at each corner, and the lower parts of the hoppers are divided by central partitions, $b$, which direct the seed to the holes at the front and back parts of the hoppers, as will be fully understood by referring to Fig. 1.

Underneath each hopper D there works a slide, E. The slides are perforated each with four holes, $c$, corresponding with the holes $a$ in the bottom of the hoppers D, and each slide has a recess in its under side to receive an adjustable perforated plate, $d$, which forms a register, by the adjustment of which the perforations in the slides E may be contracted as may be required. The hoppers D are secured on a traverse-bar, F, and the slides E work in this bar.

To the under side of the bar F seed-tubes H are attached, four for each hopper, and the upper end of the tubes H register or coincide with holes $e$ in the bar F, said holes extending up to the slides E, as shown clearly in Fig. 1.

On the axle C' there is placed a wheel, I, the periphery of which is divided into eight parts, which are alternately toothed and smooth, as shown in Fig. 1.

On the frame A there is placed a shaft, J, having upon it a pinion, K, into which the toothed parts of the wheel I gear as it rotates, and on said shaft there are placed oval hubs L, each of which is provided with a hook projection, $f$, as shown clearly in Fig. 1. The pinion K is placed loosely on the shaft J, and has a horizontal lever, M, connected to it, and to the lever M there is connected an upright lever, N, the two levers M N forming a compound-lever arrangement for actuating the pinion K, so that it may be shoved in and out of gear with the wheel I with facility.

To the back end of each slide E there is attached by a joint, $g$, a rod, O, the back ends of which terminate in hooks $h$. Each rod O has a mortise, $i$, made through it at about its center, and through these mortises springs P pass, the lower ends of said springs being attached to a traverse-bar, Q, in the frame A. The springs P have a tendency to keep the slides E shoved forward to their fullest extent. The hooks $h$ of the rods O rest or bear on the hubs L, and are kept thereon by spiral springs R, which are placed on the upper part of the springs P.

To the under side of the front cross-bar, R, of the frame A there are attached pendants $j$, which serve as guides for the front part of bars S, which have gage-rollers $k$ attached. To the front part of these bars S there are furrow-shares T attached, and covering-shares U are secured to the back part of said bars, the back part of the bars being fitted between pendants $l$, which are attached to the back cross-bar of the frame A and suspended to said cross-bars by chains $a^x$, the front end of the bars S being attached to the front cross-piece, R, by chains $a^{xx}$. The bars S are suspended near their front ends by chains or cords $m$ to levers V, which have their fulcra at $n$, and extend back and terminate just in front of the driver's seat W. To the back end of each lever V there is attached by a joint a vertical rod, X, and these rods extend up in front of the seat W.

To the back part of the frame A there are attached a series of pendent swinging frames, Y, in the lower parts of which there are secured rollers Z. These rollers Z are in line with the seed-tubes H.

The operation is as follows: As the machine is drawn along the slides E have a reciprocating movement given them by the rotating hubs L and springs P, the hooks $f$ catching against the hooks $h$ of the rods O and drawing back the slides, while the springs P throw forward the slides, the smooth parts of the wheel I causing the hubs L to rotate intermittingly.

By this reciprocating movement of the slides the seed is distributed from the hoppers D, a proper distance being allowed between the droppings, and the springs P, in throwing the slides E forward, subject them to a certain concussion which prevents the clogging or choking up of the holes in the slides. The driver at any time can elevate any or all of the bars S by depressing the rod X with his feet, thereby elevating the front part of the levers V, and consequently bars S, with their attachments. The whole device is extremely simple and efficient. The rollers Z press the earth upon the seed, and, in consequence of being fitted in the swinging frames Y, are allowed to conform to the irregularities of the earth. The shares T U operate as usual, the former opening the furrows and the latter covering the seed.

Having thus described our invention, what we claim as new, and desire to secure by Letters Patent, is—

Operating the seed-slides E by means of the oval hubs L, provided with the hook projections f, the rods O, provided with hooks h, the springs P and R, the pinion K, and wheel I, the latter being provided at its periphery with the toothed and smooth portions, and all arranged substantially as described.

DEXTER BEAL.
    WILLARD W. BEAL.

Witnesses:
 P. I. WOOD,
 J. W. JOHNSON.